United States Patent [19]

Thanner et al.

[11] Patent Number: 5,732,072
[45] Date of Patent: Mar. 24, 1998

[54] METHOD FOR ADAPTIVE ROUTING IN A COMMUNICATION NETWORK

[75] Inventors: Thomas Thanner; Gerhard Weber; Wolfgang Sitter, all of Muinch, Germany

[73] Assignee: Siemens Aktiengesellschaft, Munich, Germany

[21] Appl. No.: 521,904

[22] Filed: Aug. 31, 1995

[30] Foreign Application Priority Data

Aug. 31, 1994 [DE] Germany ............................ 44 30 993.7

[51] Int. Cl.[6] ...................................................... H04L 12/407
[52] U.S. Cl. .................................................. 370/255; 370/400
[58] Field of Search ....................................... 370/216, 217, 370/218, 225, 254, 255, 256, 351, 400, 390

[56] References Cited

U.S. PATENT DOCUMENTS

| | | | |
|---|---|---|---|
| 4,466,060 | 8/1984 | Riddle | 364/200 |
| 4,864,563 | 9/1989 | Pavey et al. | 370/94.1 |
| 5,467,345 | 11/1995 | Cutler, Jr. et al. | 370/60 |
| 5,506,838 | 4/1996 | Flanagan | 370/54 |

FOREIGN PATENT DOCUMENTS 2 236 641  3/1990  United Kingdom ............ H04M 3/36

Primary Examiner—Douglas W. Olms
Assistant Examiner—Min Jung
Attorney, Agent, or Firm—Hill, Steadman & Simpson

[57] ABSTRACT

A communication network has a plurality of mutually connected network nodes in which in each case network data relating to the network topology of the entire communication network are maintained. Depending on the network data, routing tables for connection paths to all remaining network nodes are created. If an event that influences the network topology of the communication network occurs, on the one hand the network data maintained therein are updated by the network node detecting the event. On the other hand, a broadest message corresponding to the event is transmitted to the other network nodes, following the reception of which the respective network nodes update the network data maintained therein. It is provided here that, for the transmission of the broadest message within the communication network, a condition path network is defined from the plurality of possible connection paths between the individual network nodes, via which network the broader message reaches the respective network node via only a defined number of independent connection paths.

5 Claims, 3 Drawing Sheets

METHOD FOR ADAPTIVE ROUTING IN A COMMUNICATION NETWORK

BACKGROUND OF THE INVENTION

In switching, the object of routing methods is to determine connections between the individual network nodes (switching equipment) taking the topology of a communication network into account. Connections between one originating node and one destination node are termed point-to-point connections here. The point-to-point connections determined should be optimum with respect to a defined optimization criterion. In contrast, a connection from one originating node to a plurality of destination nodes of a communication network is termed a "broadcast" connection.

The routing methods in communication networks can in principle be classified into two different types of searching methods, namely non-adaptive routing methods and adaptive routing methods. Non-adaptive routing methods here determine connections on the basis of static tables; they do not, however, take any load states or changes in the topology of the communication network into account. In the case of state changes of the communication network, the non-adaptive routing methods determine connections on the basis of the static tables, which are created during system generation and are usually modified by means of operator inputs, via previously defined alternative paths. This is also termed dynamic routing.

Adaptive routing methods, on the other hand, adapt to state changes of the communication network. Various parameters, such as load conditions, line states and line group states, are taken into account thereby. The adaptive routing methods can be further classified as centralized and distributed routing methods.

Centralized routing methods require a control center which principally maintains transport connections to all network nodes of the communication network. The individual network nodes send information relating to the current state of the communication network to the control center. Data are stored centrally and the tables required for routing are determined anew there. The changes to the routing tables resulting from a new determination are then distributed to the individual network nodes. The advantage of a control center is that the network nodes of the communication network are relieved of the load of time-consuming optimization. One disadvantage of this concept, however, is that if the control center fails, it is no longer possible to make any changes in the routing tables. Moreover, the transmission of the routing tables requires considerable transmission capacities, which can affect the performance of the communication network.

In the case of distributed routing methods, every network node of the communication network performs the optimization calculation for adapting its routing tables itself. For this purpose, information relating to the state of the communication network is exchanged. The distributed routing methods can also be differentiated with respect to the data they store. On the one hand, there are methods in which the entire topology of the communication network is known in each of the network nodes. On the other hand, there are methods in which only the immediate vicinity is known to the individual network nodes.

Depending on the data stored, different methods for exchanging information about the current state of the communication network are required in the individual network nodes. In comparison with the other methods, knowledge of the complete topology of the communication network permits extensive optimization with different objectives. If changes to the current network state occur, in the case of distributed routing methods which know the entire topology of the communication network, then first of all the databases in all network nodes are updated. A "broadcast" method is used to distribute the newly determined data to all network nodes in the communication network. Each network node then performs an optimization of the possible paths in the communication network to the other network nodes (destination nodes), taking the new data into account, in order to optimize point-to-point connections.

SUMMARY OF THE INVENTION

It is an object of the present invention to disclose a way of optimizing in particular the communication between the individual network nodes for updating the network data stored therein in each case in an adaptive distributed routing method.

According to the method of the present invention for adaptive routing in a communication network having a plurality of mutually connected network nodes, in each of the network nodes network data relating to network topology of the entire communication network is maintained. Depending on the data network, according to defined optimization criteria routing tables are individually created for connection paths to all remaining network nodes that are possible destination nodes. If an event that influences the network topology of the communication network occurs, on the one hand the network data maintained therein by the network node detecting said event is updated, and on the other hand, a broadcast message corresponding to the event is transmitted to all other network nodes. Following reception of the broadcast message, the network data maintained therein is updated with the respective network nodes. For the transmission of the broadcast message within the communication network, a connection path network is defined from the plurality of possible connection paths between the individual network nodes, the broadcast message reaching the respective network node via only a defined number of independent connection paths.

The invention here confers the advantage that a broadcast message to be output by one network node is not transmitted over all the line groups going out from this network node, but rather, to reduce the number of identical broadcast messages distributed within the communication network, a connection path network is defined from the plurality of possible connection paths between the individual network nodes, via which network the broadcast message reaches the respective network node via only a defined number of independent connection paths. This consequently reduces the number of identical broadcast messages transmitted within the communication network, but with sufficient redundancy being provided even if individual connection paths fail.

An expedient embodiment of the method according to the present invention is that a broadcast message is supplied to the respective network node only via two independent connection paths. This further reduces the number of identical broadcast messages transmitted within the communication network with a level of redundancy that is generally sufficient.

The routing tables created in the individual network nodes are expediently modified on the basis of updated network data only after a defined time period has expired. Short-term state changes in the topology of the communication network are consequently excluded from the optimization of the routing tables.

If the state of a line of a line group changes, which causes the transmission capacity of the line group to change, the routing tables are only optimized when the change has exceeded a specified threshold.

The adaptive routing method is only used to update the routing tables when the topology of the communication network changes, while a non-adaptive routing method is performed on the basis of the adaptively changed routing tables to establish connections within the communication network.

DESCRIPTION OF THE PREFERRED EMBODIMENTS

Figure 1:
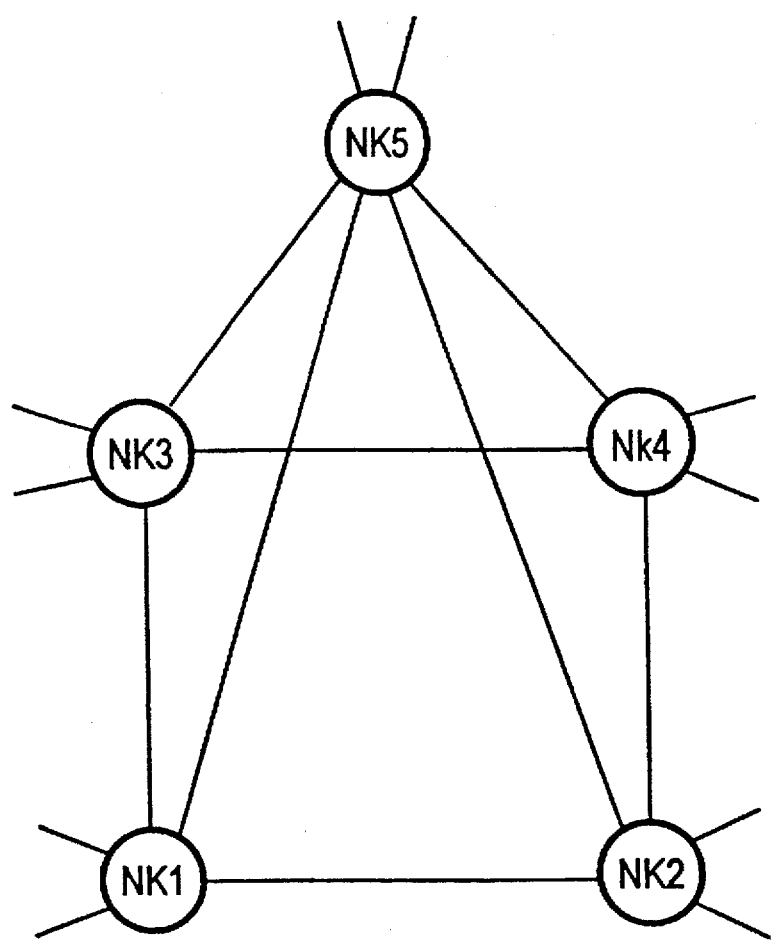
FIG. 1 shows in schematic form a communication network in which the present invention is employed.

FIG. 1 represents in schematic form a communication network which may be formed from a plurality of network nodes (switching equipment) connected to one another. Of these network nodes, only the network nodes NK1, NK2, NK3, NK4 and NK5 are indicated. It is assumed that this communication network is, for example, a packet-switching data network for the transmission of text and data. In such a data network, the data are transmitted according to the store-and-forward switching principle. The data to be transmitted are divided up at an origination point and are transmitted packet-by-packet to a respective remote station (destination point). During the transmission within the communication network, the individual data packets are temporarily stored in the network nodes participating in the transmission. In the remote station (destination point), the individual data packets are received and combined to form the original data stream again. In addition to the actual payload information, the generated packets to be transmitted contain here additional control information, for example in the form of a packet overhead, which is required for handling and forwarding the packets through the individual network nodes.

The data packets are transmitted section by section from one network node to the next network node, in which the data packets are temporarily stored until they are transmitted again. The data packets of different data streams are interleaved using time-division multiplexing so that a physical connection can be used for several data streams simultaneously there is therefore no circuit-switched connection between two subscriber terminals of the communication network, but rather a so-called virtual connection. The data packets belonging to such a virtual connection have in this case in their associated cell overhead a virtual channel number identifying this virtual connection in each case. The path for the respective virtual connection via the individual network nodes of the communication network is defined in the course of a connection establishment. The data packets transmitted during the subsequent data transfer phase, that is to say after the connection has been established, then follow exactly the path defined during the connection establishment phase.

In the communication network represented in FIG. 1, a routing method is performed to establish a virtual connection in the individual network nodes, which will be discussed in more detail below.

For routing in the individual network nodes, a dynamic routing method, already mentioned above, is employed in the communication network. This method is based on a set of static tables, namely a call number tree and the route selection tables. These tables are initially compiled during system generation. The individual network nodes are combined to form groups thereby. One route selection table is defined for each group, which is also referred to as a route destination. Such a route selection table defines the order in which the available line groups, and hence the associated neighboring nodes, are selected during a connection establishment. The first element of a route selection table is termed here the primary route, while the following ones are termed alternate routes.

When a connection is established, the call number identifying this connection is evaluated with reference to the call number tree. The result of this evaluation is a pointer to a route selection table assigned to this call number. Using this route selection table, an outgoing line group is selected, beginning with the primary route. The dynamic routing method is conceived here such that if line groups fail, a switch is made to the defined alternate routes as specified by the order in the route selection table.

In addition to this dynamic routing method, in the present exemplary embodiment an adaptive routing method is performed in the individual network nodes as a parallel process. Both processes are executed independently of one another here. The dynamic routing method is, as already mentioned, activated when connections are established, while the adaptive routing method serves to update the routing tables when the topology changes within the communication network. The common interface of the two processes is in the route selection tables. The dynamic routing method accesses the route selection tables only to read them, whereas the adaptive routing method modifies them. The order of the outgoing line groups n the route selection tables is adapted by the adaptive routing method in the event of topology changes within the communication network in accordance with the results of an optimization calculation performed. The modified route selection tables are then used when the dynamic routing method is subsequently activated again in the course of establishing a connection.

As already mentioned above, a distributed adaptive routing method, in which each network node knows the complete topology of the communication network, is carried out in the communication network represented in FIG. 1. This topology is modelled here by a graph. The network nodes are mapped as nodes; the line groups are mapped as edges of the graph. Each line group is characterized by an edge weight, which is used to determine the optimization criterion. The edge weight is termed the "Quality of Service" (QOS). The QOS for a line group is indirectly proportional to the sum of the transmission speeds of the lines belonging to this line group.

The entire communication network is structured in a main network ("backbone" network) and a plurality of feeder networks ("access" networks). The feeder networks comprise a lesser number of the less powerful network nodes. This structuring is expedient owing to the memory and run-time requirements. The computing time required by the optimization method depends on the number of network nodes in the communication network and must be provided by powerful and less powerful network nodes alike. A limitation of the number of network nodes for the optimization methods is therefore necessary, and is achieved by the structuring in a main network and feeder networks.

Figure 2:
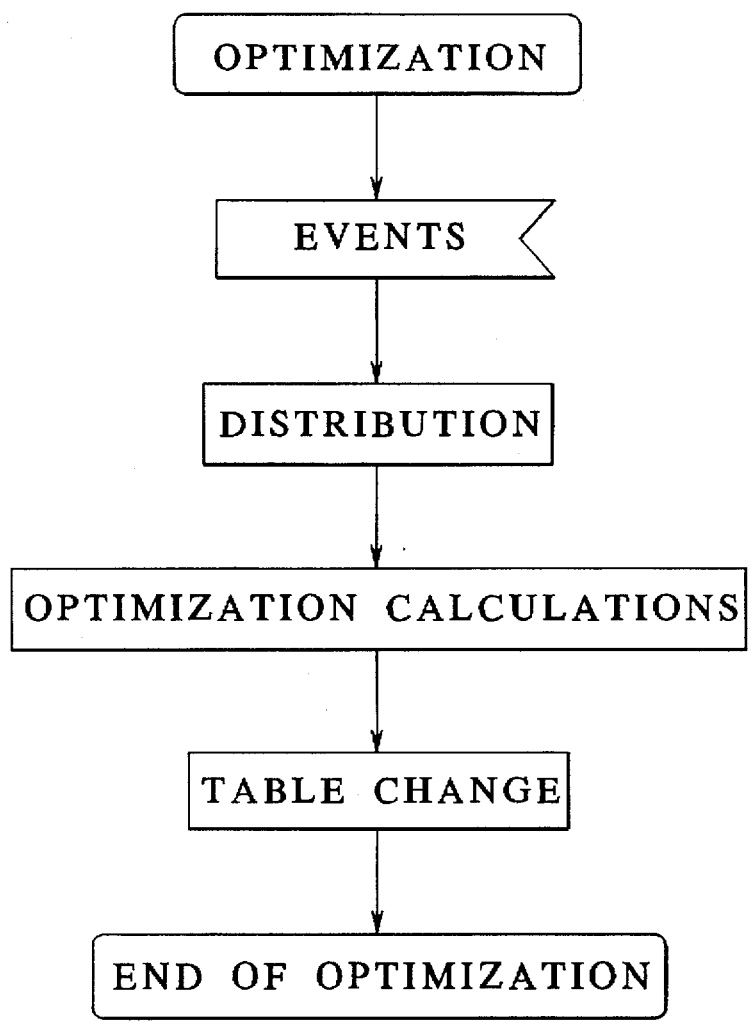
FIG. 2 shows a flow chart, which will be discussed in greater detail below.

FIG. 2 represents a flow-chart for optimization in the course of adaptive routing. In the present communication network, the adaptive routing method is an event-driven system. The occurrence of an event relevant for the adaptive routing method is detected by the participating network nodes. An evaluation is then undertaken and a distribution of the resulting network data in the entire communication network is triggered. Following this, depending on the event, an optimization calculation is performed in the respective network node by means of which the route selection tables are modified in accordance with the optimization results. The sequence of optimization is here independent of whether the event occurs at the respective network node itself, or whether the latter is notified of a particular event via the distribution mechanism. Events occurring trigger an event-specific processing. The triggering of the processing is delayed, in order to exclude short-term state changes occurring specifically from the optimization. The following events are process here:

- state changes of a line, that is to say operational readiness or failure of a line,
- state changes of a line group, that is to say operational readiness or failure of a line group,
- addition of a new network node to the communication network, and
- failure of a network node.

Line groups are, as already mentioned above, characterized by their "Quality of Service" (QOS), which is formed from the sum of QOSs of the individual lines of the line groups. If the state of a line changes, that is to say in the case of operational readiness or failure, the QOS of the associated line group changes. In the graph modeling the communication network, the weight of the edge corresponding to the line group is changed. The optimization calculations are only triggered here once the change exceeds a defined threshold.

State changes of line groups, that is to say operational readiness or failure, result in the insertion or deletion of the corresponding edge in the graph model of the communication network. If a new network node is added to the communication network, this is notified to all already existing network nodes. The added network node and the associated new line groups are inserted into the graph. The failure of a network node is handled in an analogous manner. An optimization calculation is subsequently started in the individual network nodes in each case.

The information resulting from an event is distributed within the communication network in accordance with a "broadcast" method. In this case, as fast as possible a dissemination of the information throughout the entire communication network is sought in order to keep the database existing in each network node consistent across the entire network. For this purpose, received broadcast messages are transmitted again immediately before optimization calculations are started in the respective network node.

The distribution of a broadcast message in the entire communication network, that is to say to all network nodes, can be performed according to different methods. One possible method is the so-called "flooding" method in which a received broadcast message is transmitted again on all line groups except the line group on which the broadcast message was received. This method is indeed very reliable. However, the number of identical broadcast messages distributed is very high.

A further possible method is the "spanning tree" method, in which a tree is determined which guarantees that exactly one path exists between two network nodes in each case. The tree covers all network nodes of the communication network. Received broadcast messages are transmitted again only on the line groups belonging to the "spanning tree". With this method, although the number of identical broadcast messages distributed is much lower than with the aforementioned method, distribution problems do occur whenever a line group of the "spanning tree" fails.

In the present exemplary embodiment, a "broadcast subgraph" is calculated for distributing broadcast messages. This guarantees that between each node pair only a defined number of mutually independent paths (no common edges and nodes in the graph model) are calculated. In the present exemplary embodiment, the number of mutually independent paths is defined as two, so that sufficient redundancy is provided in the e vent of a line group failing. the number of identical broadcast messages is substantially reduced in comparison with the "flooding" method, with the disadvantages of the "spanning tree" method being avoided. The calculation of the "broadcast subgraph" is based h ere on a minimum "spanning tree" in order to guarantee as rapid a distribution o fa broadcast message as possible. The "spanning tree" is expanded by adding edges to form a graph having the described characteristics. The edges to be added are taken from the graph modelling the communication network.

As soon as a network node has completed the forwarding of a broadcast message that has arrived, the received information is inserted into the database and optimization calculations are triggered. A modified form of the "shortest path" method of Dijkstra is used for optimization. This method determines the shortest paths from an originating node, that is to say the network node performing the calculation, to all other network nodes in the communication network. The shortest path is the minimum sum of all edge weights (QOS) from the originating node to a destination node. With the modified method, k is calculated as k=4 shortest paths, with the characteristic that the outgoing edges of the k shortest paths going out from the originating node are different. This ensures that if a line group fails, the next best shortest path can be selected at the originating node. The required time for determining k shortest paths from an originating node to all other network nodes depends on the complexity of the communication network. In some circumstances this complexity demands a reduction in the maximum number of nodes, which is achieved by the above-mentioned structuring in a main network and feeder networks. After the optimization calculations have been completed, the route selection tables are modified in accordance with the results determined.

The duration of the distribution of a broadcast message as well as the time required for the optimization calculation depend on the dynamic loading of the individual network nodes. This produces a time window (completion point of the optimization calculations between the first and last network nodes) in which the routing tables are not consistent throughout the network. During this time window, therefore, loops can occur when connections are being established. Loops are produced if one of the network nodes traversed during the connection establishment phase is selected a second time. In this case, the connection establishment phase is aborted and the respective call is released. As soon as the last network node has finished its optimization calculations, the routing tables are consistent again across the entire network.

Figure 3:
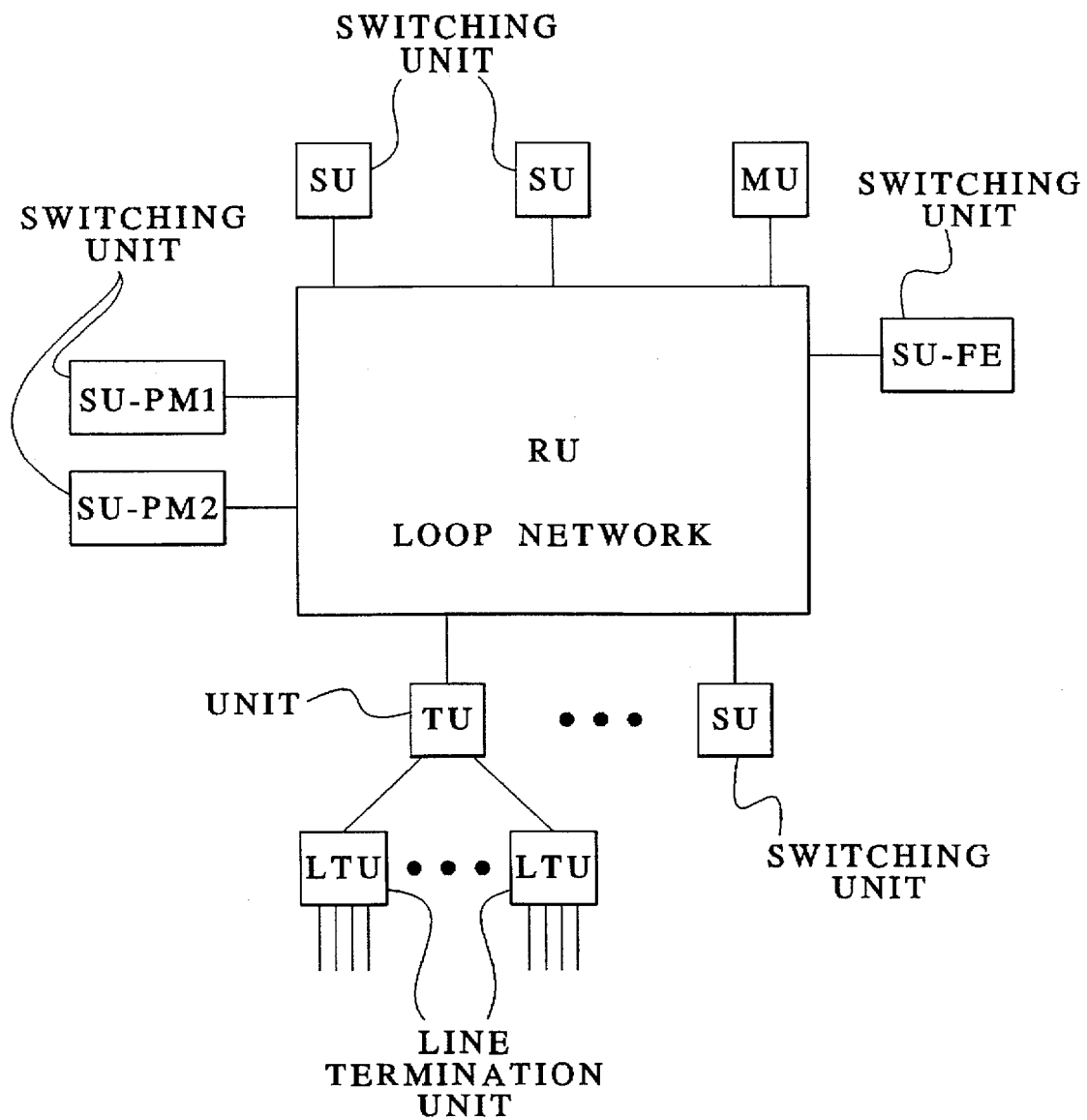
FIG. 3 shows a possible design of a network node which is represented only schematically in FIG. 1.

FIG. 3 represents a possible design of the aforementioned network nodes. According to this FIG., each network node is formed from a loop network RU, to which, inter alia, units SU ("switching unit") are connected which perform the call handling and the routing. The switching operations are performed by these units with load sharing. In addition, connected to the loop network are further units TU to which line termination units (LEU) connected to lines are connected. For the aforementioned adaptive routing method, two of the units SU present in a network node are selected, which are denoted SU-PM1 and SU-PM2 in FIG. 3. SU-PM1 and SU-PM2 perform the tasks required for the adaptive routing method parallel to the switching operations. They differ with respect to the tasks they are to perform. As the active unit, the unit denoted SU-PM1 carries out all communications with the other network nodes in the network, the internal communications in the network node, and the optimization calculations. The unit SU-PM2, which operates in "standby mode" only updates its database for the adaptive routing method so that it is able to take over the tasks of the unit SU-PM1 if the latter fails.

As just mentioned, the unit SU-PM1 handles the external communication with the other network nodes in the communication network. The external communication also covers here the exchange of information in the case of a node runup and the distribution of the broadcast messages.

In the case of a node runup, the active unit SU-PM1 in the network node being run up is informed of the already existing topology of the communication network by a neighboring network node. The entire topology of the communication network is therefore known to the new network node. The new network node then transmits its node identifier including the new line groups to its neighboring nodes. The neighboring nodes undertake the distribution of this information according to the distribution principle stated above. The new node being run up is consequently known in the entire communication network and is included in the optimization calculations in the individual network nodes.

During the distribution of the broadcast messages, the active unit SU-PM1 of the respective network node transmits the messages on the line groups belonging to the above-mentioned "broadcast subgraph".

As already mentioned, events that change the topology of the network are detected by the respective network node itself, or the latter is notified thereof by means of external communication. Following this, optimization calculations are triggered in the respective network node, which lead to the routing tables being modified. In a network node, all units SU have identical routing tables here. If changes to the routing tables arise, then initially these are known only in the active unit SU-PM1, since it is only the latter that performs the optimization calculations. The changes in the routing tables are then notified to the other units SU within the respective network node.

In addition, at periodic intervals, information relating to the node states is exchanged between the network nodes and is compared with information already present, in order to be able to make a corresponding modification in the event of an inconsistency.

Finally, it should be noted that the present invention has been described above using the example of a packet-switching data network. However, it can be used in any communication networks whenever an adaptive routing method is to be performed therein.

Although various minor changes and modifications might be proposed by those skilled in the art, it will be understood that we wish to include within the claims of the patent warranted hereon all such changes and modifications as reasonably come within our contribution to the art.

We claim as our invention:

1. A method for adaptive routing in a communication network having a plurality of mutually connected network nodes wherein network data relating to network topology of the communication network are maintained in each of the network nodes, comprising the steps of:

depending on said network data, individually creating according to defined optimization criteria routing tables for connection paths to all remaining network nodes that are possible destination nodes;

if an event that influences the topology of the communication network occurs, updating network data maintained by a network node detecting said event, and transmitting a broadcast message corresponding to the event to all other network nodes;

following reception of said broadcast message, updating with respective network nodes the network data maintained in the respective network nodes; and for transmission of said broadcast message within the communication network, defining a connection path network from a plurality of possible connection paths between the individual network nodes, the broadcast message reaching the respective network node via said connection path network and via only a defined restricted plurality of independent connection paths.

2. A method for adaptive routing in a communication network having a plurality of mutually connected network nodes wherein network data relating to network topology of the communication network are maintained in each of the network nodes, comprising the steps of:

depending on said network data, individually creating according to defined optimization criteria routing tables for connection paths to all remaining network nodes that are possible destination nodes;

if an event that influences the network topology of the communication network occurs, updating network data maintained by a network node detecting said event, and transmitting a broadcast message corresponding to the event to all other network nodes;

following reception of said broadcast message, updating with respective network nodes the network data maintained in the respective network nodes;

for transmission of said broadcast message within the communication network, defining a connection path network from a plurality of possible connection paths between the individual network nodes, the broadcast message reach the respective network node via said connection path network and via only a defined number of independent connection paths; and supplying the broadcast message to the respective network node only via two independent connection paths.

3. A method for adaptive routing in a communication network having a plurality of mutually connected network nodes wherein network data relating to network topology of the communication network are maintained in each of the network nodes, comprising the steps of:

depending on said network data, individually creating according to defined optimization criteria routing tables for connection paths to all remaining network nodes that are possible destination nodes;

if an event that influences the network topology of the communication network occurs, updating network data maintained by a network node detecting said event, and transmitting a broadcast message corresponding to the event to all other network nodes;

following reception of said broadcast message, updating with respective network nodes the network data maintained in the respective network nodes;

for transmission of said broadcast message within the communication network, defining a connection path network from a plurality of possible connection paths between the individual network nodes, the broadcast message reaching the respective network node via said connection path network and via only a defined number of independent connection paths; and modifying the created routing tables in the individual network nodes based on updated network data only after a defined time period has expired.

4. A method for adaptive routing in a communication network having a plurality of mutually connected network nodes wherein network data relating to network topology of the communication network are maintained in each of the network nodes, comprising the steps of:

depending on said network data, individually creating according to defined optimization criteria routing tables for connection paths to all remaining network nodes that are possible destination nodes;

if an event that influences the network topology of the communication network occurs, updating network data maintained by a network node detecting said event, and transmitting a broadcast message corresponding to the event to all other network nodes;

following reception of said broadcast message, updating with respective network nodes the network data maintained in the respective network nodes;

for transmission of said broadcast message within the communication network, defining a connection path network from a plurality of possible connection paths between the individual network nodes, the broadcast message reaching the respective network node via said connection path network and via only a defined number of independent connection paths; and where a state change of a line group occurs which causes transmission capacity of said line group to change, only optimizing the routing tables when the change exceeds a specified threshold.

5. A method according to claim 1 including the step of only using the adaptive routing method to update the routing tables when the topology of the communication network changes, and performing a non-adaptive routing method based on the adaptively changed routing tables to establish connections within the communicating network.

* * * * *